(12) United States Patent
Paluru et al.

(10) Patent No.: US 12,468,592 B2
(45) Date of Patent: Nov. 11, 2025

(54) SYSTEMS AND METHODS FOR PROVIDING INSIGHTS, ANALYTICS, AND MONITORING ON THE CRITICALITY OF APPLICATIONS IMPACTED BY LINK FAILURES

(71) Applicant: Aviz Networks, Inc., San Jose, CA (US)

(72) Inventors: Madhu Paluru, Fremont, CA (US); Chidambaram Bhagavathiperumal, Livermore, CA (US)

(73) Assignee: Aviz Networks, Inc., San Jose, CA (US)

( * ) Notice: Subject to any disclaimer, the term of this patent is extended or adjusted under 35 U.S.C. 154(b) by 528 days.

(21) Appl. No.: 18/101,074

(22) Filed: Jan. 24, 2023

(65) Prior Publication Data

US 2024/0248782 A1    Jul. 25, 2024

(51) Int. Cl.
*G06F 11/07* (2006.01)
*G06F 9/54* (2006.01)
*H04L 43/00* (2022.01)
*H04L 43/0829* (2022.01)

(52) U.S. Cl.
CPC ............ *G06F 11/079* (2013.01); *G06F 9/54* (2013.01); *G06F 11/0745* (2013.01); *H04L 43/00* (2013.01); *H04L 43/0829* (2013.01)

(58) Field of Classification Search
None
See application file for complete search history.

(56) References Cited

U.S. PATENT DOCUMENTS

| 6,188,674 B1 * | 2/2001 | Chen | H04L 43/0835 370/413 |
| 2013/0329580 A1 * | 12/2013 | Missett | H04L 43/0835 370/252 |
| 2015/0312118 A1 * | 10/2015 | Behera | H04L 45/26 370/241 |

\* cited by examiner

*Primary Examiner* — Angela Nguyen
(74) *Attorney, Agent, or Firm* — Select IP Law Corporation; Ashkon Cyrus

(57) ABSTRACT

In some aspects, a method may include installing, by a control plane application, a plurality of access control lists (ACLs) to an ASIC using hardware programming APIs. Also, the method may include identifying traffic flowing through the ASIC with the plurality of ACLs both on ingress and egress to create matched packets. Furthermore, the method may include executing an accounting of the matched packets using one or more hardware get APIs of the ASIC to create collected data. In addition, the method may include correlating the collected data from the one or more hardware get APIs to calculate a packet loss for a particular application and to create application correlated data. Moreover, the method may include exporting the application correlated data to an external monitoring platform over a secure channel.

15 Claims, 2 Drawing Sheets

200

┌─────────────────────────────────────────────────────────────────┐
│ Install, by a control plane application, a plurality of access control lists (ACLs) to an │
│ ASIC using hardware programming APIs │
│ 202 │
└─────────────────────────────────────────────────────────────────┘
                                    ↓
┌─────────────────────────────────────────────────────────────────┐
│ Identify traffic flowing through the ASIC with the plurality of ACLs both on ingress │
│ and egress to create matched packets │
│ 204 │
└─────────────────────────────────────────────────────────────────┘
                                    ↓
┌─────────────────────────────────────────────────────────────────┐
│ Execute an accounting of the matched packets using one or more hardware get APIs │
│ of the ASIC to create collected data │
│ 206 │
└─────────────────────────────────────────────────────────────────┘
                                    ↓
┌─────────────────────────────────────────────────────────────────┐
│ Correlate the collected data from the one or more hardware get APIs to calculate a │
│ packet loss for a particular application and to create application correlated data │
│ 208 │
└─────────────────────────────────────────────────────────────────┘
                                    ↓
┌─────────────────────────────────────────────────────────────────┐
│ Export the application correlated data to an external monitoring platform over a │
│ secure channel │
│ 210 │
└─────────────────────────────────────────────────────────────────┘

FIG. 2

SYSTEMS AND METHODS FOR PROVIDING INSIGHTS, ANALYTICS, AND MONITORING ON THE CRITICALITY OF APPLICATIONS IMPACTED BY LINK FAILURES

BACKGROUND

Link failures in organizational networks may be caused by a wide range of factors such as hardware malfunctions, optical component malfunction, and incorrect physical layer configurations. It is typically thought that network link failures are to some degree an inevitable aspect of network infrastructure operation, yet they still cause many problems for network infrastructure providers.

As an example, network failures can result in in packet loss which may negatively impact various applications deployed in a network. If any these applications are mission-critical this can result in catastrophic consequences to end users and network operators alike. Moreover, a large proportion of link failures are caused by failed optical components which thus requires their physical replacement by data center operators (DCOs) thus incurring major operational and capital expenses for the network infrastructure provider.

Thus, what is needed are systems and methods for providing insights, analytics, and monitoring on the criticality of applications impacted by link failures.

SUMMARY

Some implementations herein relate to methods for providing insights, analytics, and monitoring of the criticality of applications impacted by link failures. An exemplary method may include installing, by a control plane application, a plurality of access control lists (ACLs) to an ASIC using hardware programming APIs, identifying traffic flowing through the ASIC with the plurality of ACLs both on ingress and egress to create matched packets, and executing an accounting of the matched packets using one or more hardware get APIs of the ASIC to create collected data.

According to an embodiment, the method may in addition include correlating the collected data from the one or more hardware get APIs to calculate a packet loss for a particular application and to create application correlated data. A method may moreover include exporting the application correlated data to an external monitoring platform over a secure channel.

Other embodiments of this aspect include corresponding computer systems, apparatus, and computer programs recorded on one or more computer storage devices, each configured to perform the actions of the methods.

The described implementations may also include one or more of the following features. A method where traffic is identified to create matched packets by using layer 3 IP header information. A method where header information includes a Source IP and a Destination IP combined with TCP port numbers. A method where the plurality of ACLs are applied permanently to monitor and collect a loss. A method where the plurality of ACLs are installed on a demand basis. Implementations of the described techniques may include hardware, a method or process, or a computer tangible medium.

BRIEF DESCRIPTION OF THE DRAWINGS

For a more complete understanding of the present disclosure and its advantages, reference is now made to the following description taken in conjunction with the accompanying drawings, in which like reference numerals represent like parts.

FIG. 2 is a flowchart of an example process for providing insights, analytics, and monitoring on the criticality of applications impacted by link failures.

DETAILED DESCRIPTION

Figure 1:
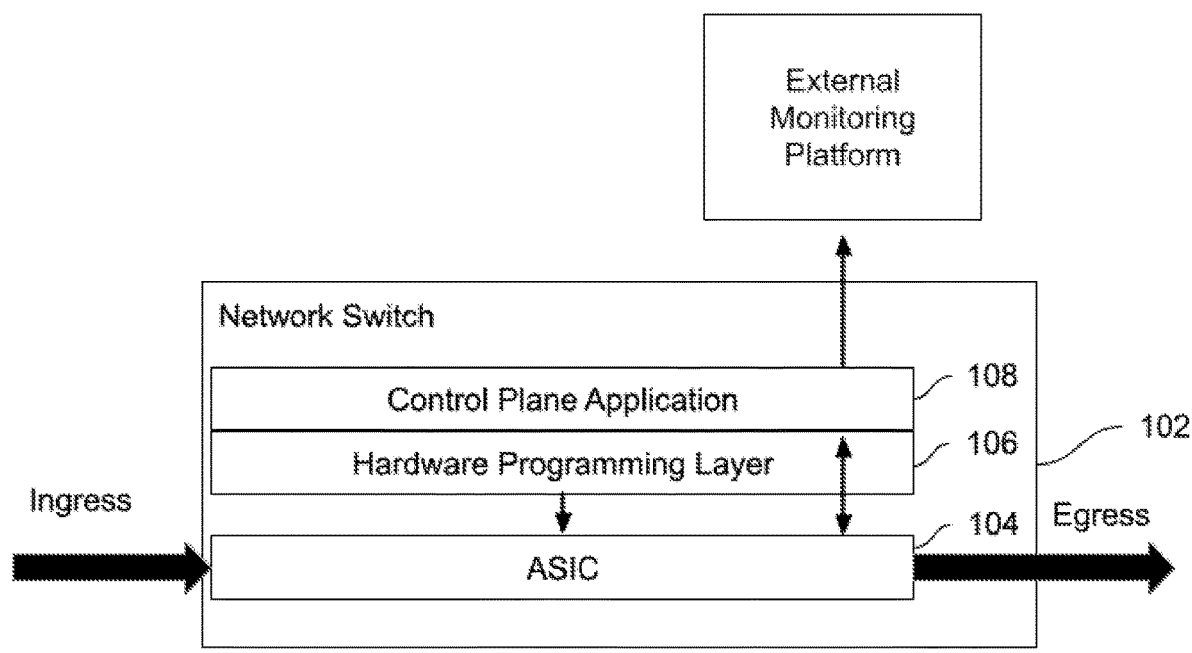
FIG. 1 illustrates system architecture according to an embodiment of the present disclosure.

FIG. 1 illustrates system architecture according to an embodiment of the present disclosure. An ASIC 104 is integrated within a switch 102. According to embodiments of the present disclosure, ASIC 104 performs a wide range of tasks such as forwarding and filtering packets, implementing security protocols, and managing the flow of traffic. According to an embodiment of the present disclosure ASIC 104 is responsible for low-level, high-speed processing of network traffic and can handle a large amount of data in parallel.

According to an embodiment, ASIC 104 interacts with a Hardware Programming Layer 106, wherein the Hardware Programming Layer 106 acts as a bridge between ASIC 104 and a Control Plane Application 108. According to a further embodiment, Hardware Programming Layer 106 provides a set of APIs (also defined as Hardware Programming APIs) that allow Control Plane Application 108 to configure and control ASIC 104.

It can be appreciated that the Hardware Programming APIs provide a high-level abstraction of the functionality of ASIC 104 thus allowing Control Plane Application 108 to program the ASIC 104 without needing to know any low-level details of ASIC 104.

According to a further embodiment, a hashing algorithm is provided to determine the path that a packet should take based on certain fields in the packet header. These fields can include, for example, the source and destination IP address, source and destination port, and protocol. According to an embodiment, an ECMP (Equal-Cost Multi-Path) hash calculator is provided to distribute network traffic across multiple paths of equal cost. It can be appreciated that the ECMP hash calculator ensures that packets with the same fields are consistently sent down the same path, providing a consistent and predictable flow of traffic.

According to an embodiment, Control Plane Application 108 is responsible for managing the overall behavior of switch 102, configuring security policies, and monitoring the network's performance. According to a further embodiment, an Ingress interface 110 is installed for accounting for the critical application flows ingressing to ASIC 104 and an Egress interface 112 is installed for accounting the critical application flows egressing from ASIC 104. According to a further embodiment, a NOS (Network Operating System) agent is provided as part of Control Plane Application 108, wherein the NOS agent communicates with a plurality of network devices to gather information and make changes to the network configuration. The agent may also communicates with the system processor to receive instructions and report back on the status of the network. Other services that may be provided in the Control Plane Application 108 may include Network Management services, Network Security Services, Network Analytics services, and other related Automation and Coordination services.

All of the services in Control Plane Application 108 seamlessly interact such that the network is operating efficiently and effectively. According to a further embodiment, all of the services in Control Plane Application 108 are controlled by the NOS agent.

According to a further embodiment, Access control lists (ACLs) are implemented into ASIC 104 wherein the ACLs are used to filter packets based on predetermined criteria. Predetermined criteria may include source and destination IP addresses, port numbers, and protocol, and state information. Embodiments of the present disclosure may include various ACLs that are commonly used by ASIC vendors including IP, MAC, VLAN, Protocol, and Stateful ACLs.

According to a further embodiment, the ACLs are applied as a pair both on Ingress interface 110 and egress interface 112. According to a further embodiment, multiple ingress interfaces and egress interfaces are provided, wherein the ingress interfaces are installed for accounting for the critical application flows ingressing to ASIC 104 and the Egress interfaces are installed for accounting the critical application flows egressing from ASIC 104.

FIG. 2 is a flowchart of an example process 200 for providing insights, analytics, and monitoring on the criticality of applications impacted by link failures. In some implementations, one or more process blocks of FIG. 2 may be performed by a switch device containing a processor that executes instructions to implement a Control Plane Application.

As shown in FIG. 2, process 200 may include installing, by a control plane application, a plurality of access control lists (ACLs) to an ASIC using hardware programming APIs (block 202). A switch device can install a plurality of access control lists (ACLs) to an ASIC using a variety of hardware programming APIs. According to an embodiment the method uses a command line interface (CLI) to configure the ACLs on the switch. In an alternative embodiment, the method uses a software development kit (SDK) that provides APIs for programming the ASIC directly. Additionally, some switch devices may also allow for the use of Open-Flow or other network protocol to program the ACLs onto the ASIC. Another embodiment implements a web-based interface thus allowing for the creation and management of ACLs through a web browser accessible to the responsible parties. According to yet another embodiment, a configuration file is utilized to install multiple ACLs on the switch, where this file may be uploaded via a USB or via a network management protocol.

As also shown in FIG. 2, process 200 may include identifying traffic flowing through the ASIC with the plurality of ACLs both on ingress and egress to create matched packets (block 204). For example, device may identify traffic flowing through the ASIC with the plurality of ACLs both on ingress and egress to create matched packets using packet headers, which contain information such as source and destination IP addresses, port numbers, and protocol type. Another method of identifying traffic flowing through the ASIC with the plurality of ACLs both on ingress and egress utilizes packet payload, which can be searched for specific keywords or patterns. According to another embodiment flow-based identifications are utilized such that ASIC uses five-tuple information (source IP, destination IP, source port, destination port and protocol).

As further shown in FIG. 2, process 200 may include executing an accounting of the matched packets using one or more hardware get APIs of the ASIC to create collected data (block 206). Hardware get APIs may include one or more register read APIs, memory read APIs and counter read APIs. Registers read APIs may contain information such as the current status of the ASIC, configuration settings, or performance statistics. Additionally, memory locations may contain information such as packet buffers, forwarding tables, or other data structures used by the ASIC. It can be appreciated that counter read APIs may track information such as the number of packets processed, the number of packets dropped, or the number of errors encountered.

As also shown in FIG. 2, process 200 may include correlating the collected data from the one or more hardware get APIs to calculate a packet loss for a particular application and to create application correlated data (block 208). As further shown in FIG. 2, process 200 may include exporting the application correlated data to an external monitoring platform over a secure channel (block 210). According to embodiment the method utilizes secure file transfer protocol (SFTP) or secure shell (SSH) to securely transfer the application correlated data from the switch to the external platform. Another embodiment utilizes a secure message-oriented protocol such as MQTT, AMQP, or HTTPS to transfer the application correlated data, such that application correlated data remains encrypted while it is in transit between the switch and the external platform. The switch can also use a secure protocol such as SNMPv3 to export application correlated data to the external platform such that the protocol provides encryption and authentication mechanisms to secure the data.

Process 200 may include additional implementations, such as any single implementation or any combination of implementations described below and/or in connection with one or more other processes described elsewhere herein. In a first implementation, traffic is identified to create matched packets by using layer 3 IP header information.

In a second implementation, alone or in combination with the first implementation, header information includes a Source IP and a Destination IP combined with TCP port numbers.

In a third implementation, alone or in combination with the first and second implementation, the plurality of ACLs are applied permanently to monitor and collect a loss.

In a fourth implementation, alone or in combination with one or more of the first through third implementations, the plurality of ACLs are installed on a demand basis.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

According to an embodiment of the present disclosure, as an initial step of calculating application packet loss in the system, a processor is configured to identify a flow using the Layer 3 IP header information which includes the Source/Destination IP combined with TCP port numbers. After the flow is identified, flow statistics can be collected using the ACLs. In one embodiment, the ACLs can be applied permanently to monitor and collect the loss. In another embodiment, ACLs can be installed on a demand basis.

According to an embodiment, one or more ingress interface(s) are provided for directly connected hosts at the first hop and for correlating the egress interface from the ECMP hash calculator for a given flow and LLDP information for peer connectivity.

According to an embodiment, the egress interface(s) can be derived based on the ECMP hash calculator supported by ASIC vendors or list of next hops. The ingress and egress interfaces can also be identified using the various tiers in the data center fabric. It can be appreciated that application traffic direction can be used to derive the ingress interfaces and egress interfaces. For example, on a leaf device, a "TOR-to-Leaf" connected interface can be used as an ingress interface and a "Leaf-to-Spine" connected interface can be used as egress interface.

According to this embodiment, once the ACLs are installed for the critical application flows, the statistics are collected by the NOS agent running in the control plane as a service. During normal operation, ingress and egress ACLs will have the same number of packets accounted for. On link failure, the system may calculate packet loss by determining the difference between the ingress and the egress ACL count, such that this calculation will give the packet loss for the critical flow due to this event. According to a further embodiment, the NOS agent performs a correlation of this packet loss with the link failure event on the device to create correlated information. The correlated information can be exported as a critical event to the alerting or ticketing system of the infrastructure provider.

According to a further embodiment, the infrastructure provider interacts with DCOs (Data Center Operators) take proactive measures to prevent any critical events from becoming major problems. For example, the infrastructure providers. Only these critical events need to be addressed with high priority by the DCOs. In addition to doing the correlation, counters are continuously exported to external monitoring systems for historical analysis including historical data. The historical data can help the DCOs identify the optical components and systems causing the majority of the outages and eventually make decisions on future Capital Expenditure (CAPEX) for a particular Optics vendor.

According to a further embodiment, after critical applications have been isolated, non-critical applications can be optimized at the hosts for latency. One method of optimizing is by increasing the TCP timeouts. It can be appreciated that this will reduce the Operating Expenditure (OPEX) for infrastructure providers for handling link failures in the network.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations.

Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   installing, by a control plane application, a plurality of access control lists (ACLs) to an ASIC using hardware programming APIs;
   identifying traffic flowing through the ASIC with the plurality of ACLs both on ingress and egress to create matched packets;
   executing an accounting of the matched packets using one or more hardware get APIs of the ASIC to create collected data;
   correlating the collected data from the one or more hardware get APIs to calculate a packet loss for a particular application and to create application correlated data; and
   exporting the application correlated data to an external monitoring platform over a secure channel.

2. The method of claim 1, wherein traffic is identified to create matched packets by using layer 3 IP header information.

3. The method of claim 2 wherein header information includes a Source IP and a Destination IP combined with TCP port numbers.

4. The method of claim 3, wherein the plurality of ACLs are applied permanently to monitor and collect a loss.

5. The method of claim 3, wherein the plurality of ACLs are installed on a demand basis.

6. A device comprising:
   one or more processors configured to:
   install, by a control plane application, a plurality of access control lists (ACLs) to an ASIC using hardware programming APIs;
   identify traffic flowing through the ASIC with the plurality of ACLs both on ingress and egress to create matched packets;
   execute an accounting of the matched packets using one or more hardware get APIs of the ASIC to create collected data;
   correlate the collected data from the one or more hardware get APIs to calculate a packet loss for a particular application and to create application correlated data; and
   export the application correlated data to an external monitoring platform over a secure channel.

7. The device of claim 6, wherein traffic is identified to create matched packets by using layer 3 IP header information.

8. The device of claim 7, wherein header information includes a Source IP and a Destination IP combined with TCP port numbers.

9. The device of claim 8, wherein the plurality of ACLs are applied permanently to monitor and collect a loss.

10. The device of claim 8, wherein the plurality of ACLs are installed on a demand basis.

11. A non-transitory computer-readable medium storing a set of instructions, the set of instructions comprising:

one or more instructions that, when executed by one or more processors of a device, cause the device to:

install, by a control plane application, a plurality of access control lists (ACLs) to an ASIC using hardware programming APIs;

identify traffic flowing through the ASIC with the plurality of ACLs both on ingress and egress to create matched packets;

execute an accounting of the matched packets using one or more hardware get APIs of the ASIC to create collected data;

correlate the collected data from the one or more hardware get APIs to calculate a packet loss for a particular application and to create application correlated data; and export the application correlated data to an external monitoring platform over a secure channel.

12. The non-transitory computer-readable medium of claim 11, wherein traffic is identified to create matched packets by using layer 3 IP header information.

13. The non-transitory computer-readable medium of claim 12, wherein header information includes a Source IP and a Destination IP combined with TCP port numbers.

14. The non-transitory computer-readable medium of claim 13, wherein the plurality of ACLs are applied permanently to monitor and collect a loss.

15. The non-transitory computer-readable medium of claim 13, wherein the plurality of ACLs are installed on a demand basis.

* * * * *